United States Patent [19]

Schindler et al.

[11] 4,110,494

[45] Aug. 29, 1978

[54] PROCESS FOR THE MANUFACTURE OF FILMS AND COATINGS CONTAINING POLYVINYL ALCOHOL AND HAVING A REDUCED SOLUBILITY IN WATER

[75] Inventors: Hermann Schindler, Wallau, Taunus; Wolfgang Zimmermann, Kelkheim, Taunus, both of Fed. Rep. of Germany

[73] Assignee: Hoechst Aktiengesellschaft, Frankfurt am Main, Fed. Rep. of Germany

[21] Appl. No.: 751,167

[22] Filed: Dec. 16, 1976

[30] Foreign Application Priority Data

Dec. 20, 1975 [DE] Fed. Rep. of Germany ....... 2557557

[51] Int. Cl.² ............................................. C08F 45/04
[52] U.S. Cl. ............................. 427/385 R; 260/42.51; 427/391; 526/10
[58] Field of Search ...................... 260/42.51; 526/10; 427/391, 385 R

[56] References Cited

U.S. PATENT DOCUMENTS

| | | | |
|---|---|---|---|
| 3,087,920 | 4/1963 | Suzumara et al. | 260/42.51 X |
| 3,829,402 | 8/1974 | Zimmerman et al. | 260/42.51 X |

FOREIGN PATENT DOCUMENTS 2,039,467   2/1972   Fed. Rep. of Germany ........ 260/42.51

*Primary Examiner*—Michael R. Lusignan
*Attorney, Agent, or Firm*—Curtis, Morris & Safford

[57] ABSTRACT

Polyvinyl alcohol containing films and coatings having a reduced water solubility are prepared from polyvinyl alcohol having an ester number of at most 200 mg of KOH/g. This polyvinyl alcohol being readily soluble in water is submitted in aqueous phase to an after saponification with alkali metal or alkaline earth metal hydroxide rendering it insoluble at elevated temperature. The alkali or alkaline earth metal ions then are precipitated in the form of compounds difficultly soluble in water by additions of substances containing corresponding anions. The precipitate remains as inert filler in the suspension of polyvinyl alcohol thus prepared. The suspension is applied in form of films or coatings and dried.

8 Claims, No Drawings

PROCESS FOR THE MANUFACTURE OF FILMS AND COATINGS CONTAINING POLYVINYL ALCOHOL AND HAVING A REDUCED SOLUBILITY IN WATER

The present invention relates to a process for the manufacture of films and coatings containing polyvinyl alcohol and having a reduced solubility in water.

In certain fields, for example in the glue and paper coating field, specifically in connection with the use of fillers and glue colors bound with a polyvinyl alcohol, the aqueous composition containing a solution of polyvinyl alcohol should become as resistant to water as possible after drying, i.e. at least the binder portion based on polyvinyl alcohol should not dissolve in cold water, for example in the rain.

Chemical processes for rendering films and coatings based on polyvinyl alcohol more resistant to water involve in most cases aggressive reactants and catalysts. These mixtures moreover have a limited storage time and they frequently demand heating of the applied system.

It is known that the water-solubility of a polyvinyl alcohol film is reduced with a progressive degree of saponification of the polyvinyl acetate, from which the polyvinyl alcohol is derived. The methanolysis reaction, according to which polyvinyl alcohol is generally prepared may be represented by the following scheme:

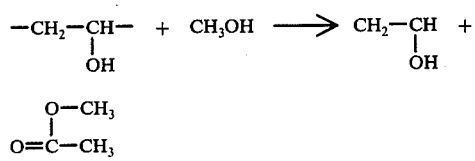

It is carried to completion asymtotically at a saponification degree of about 97 to 99 mol % of the basic polyvinyl acetate, which corresponds to an ester number of about 10 to 30 mg of KOH/g. The solubility of a polyvinyl alcohol in water is, however, considerably reduced with an ester number below 30.

Methods for attaining such low ester numbers by methanolysis of polyvinyl acetate require a considerable technical expenditure, for example a multi-step methanolysis, and large quantities of catalyst which have to be removed by washing from the final product with the aid of great quantities of methanol.

It is known from German offenlegungsschrift No. 2,039,467 to prepare a polyvinyl alcohol having a high resistance to cold water, in the following way:
A polyvinyl alcohol having a saponification degree of about 80 to 99 % is submitted to an after-saponification by alkali metal or alkaline earth metal hydroxide, in aqueous solution, whereby the residual acetyl groups are practically completely saponified. The aforesaid polyvinyl alcohols, however, can be used only for the purposes mentioned in the above application, for example as a binder for soil consolidation, for hydraulic inoculation processes, for encapsulating seed and as an adhesive in wettable powder formulations for plant protecting compositions.

When using said polyvinyl alcohol for the manufacture of films and coating the excess of alkali metal or alkaline earth metal hydroxide or of the soluble alkali metal or alkaline earth metal compounds resulting from the after-saponification has a detrimental effect so that water-resistant films and coating cannot be obtained due to the content of water-soluble compounds.

A process for the manufacture of films and coating containing polyvinyl alcohol and having a reduced solubility in water has now been found, which comprises submitting polyvinyl alcohol having an ester number of at most 200 mg of KOH/g, in an aqueous phase, to an after-saponification with alkali metal or alkaline earth metal hydroxide at elevated temperature, precipitating the alkali metal or alkaline earth metal ions in the form of compounds difficulty soluble in water by the addition of substances containing suitable anions to yield an inert filler that remains in the polyvinyl alcohol, and preparing films and coatings from the polyvinyl alcohol suspension thus obtained and drying them optionally under elevated temperature and under reduced pressure.

When a solution of polyvinyl alcohol is used in combination with a filler, a number of very interesting technical advantages are obtained in various fields, by coupling the known after-saponification with a precipitation of the saponifying reactant.

It is known that polyvinyl alcohol is applied in the form of an aqueous solution in most cases. These aqueous solutions have a high binding power for pigments, which enables solutions of polyvinyl alcohol to be used frequently with inert pigments, fillers, such as calcium carbonate, silicates and the like transparency of the polyvinyl alcohol films is not required in these cases.

The structure of the compound precipitated by the reactant after having been saponified depends on the reaction conditions. It may vary from finely divided to coarse. In most cases the precipitation product is rather finely divided, as the solution of polyvinyl alcohol acts simultaneously as protective colloid.

This factor is rather advantageous for coating colors and glue coatings bound by polyvinyl alcohol.

On the other hand, coarse precipitates, which yield a rough surface structure confer the desired slipping resistance upon the texture of paper or card-board, for example for packaging purposes.

The process of the invention has the further advantage that it makes it possible to start from a polyvinyl alcohol having an ester number of slightly less than 200 mg of KOH/g, which can be easier dissolved in water and, consequently, can be handled more easily, and to obtain nevertheless products which have a reduced water-solubility.

Combinations of calcium hydroxide and phosphoric acid, or carbonic acid, for example in the form of ammonium carbonate, and oxalic acid for special purposes or of barium hydroxide, combined with sulfuric acid are used preferably. Also alkali metal hydroxide may be precipitated with bismuth nitrate or potassium antimonate.

The combination of calcium hydroxide with carbonic acid is especially interesting, as it can take place through the action of atmospheric carbon dioxide, if the substrate is sufficiently resistant to prolonged contact with calcium hydroxide.

The excess of alkaline earth metal hydroxide according to the invention should be at least 0.1 val/unit of ester number.

The alkali metal hydroxide or alkaline earth metal hydroxide is advantageously added by stirring in the course of the manufacture of the solution of polyvinyl alcohol or it is introduced into a solution which is still warm from the dissolution process.

The reaction time is about 5 minutes at a temperature of about 70° C. Corresponding longer saponification times are necessary when working at lower temperatures.

For neutralizing the OH ions or for precipitating the alkaline earth metal or alkali metal ions approximately stoichiometric quantities of reactant are required such that the polyvinyl alcohol solution used, which contains the precipitated saponifying reactant as filler, has a pH of 4 to 8. An excess of acid possibly present can be neutralized with alkaline earth metal acetate. Thus acetic acid is formed besides insoluble alkaline earth metal compound. This acid is removed during the subsequent drying process.

The process according to the invention may be used advantageously wherever fully saponified polyvinyl alcohols having an ester number of less than 5 are used in combination with a filler:

In the adhesives field for the manufacture of paper bobbins, cardboard, kraft paper linings and/or doublings; in the paper industry for the manufacture of coating colors for paper; as a binder for non-wovens, especially for glass fiber fleeces; in the painting field for separating and protective varnishes based on polyvinyl alcohol, for glue colors and fillers bound by polyvinyl alcohol, which are completely resistant to water. The suspension of polyvinyl alcohol prepared according to the invention may also be used as erosion protection for surface soil, especially when calcium phosphate, which acts as a finely divided artificial fertilizer is contained therein in suspension.

Nearly all of the above applications of polyvinyl alcohol for the process according to the invention involve a conversion of the polyvinyl alcohol portion into a film. The following examples show the solubility of films of polyvinyl alcohol prepared as described above, under specified conditions, in comparison with a corresponding film of the polyvinyl alcohol used as a starting material.

The field of application of the films and coatings prepared according to the present invention is so wide that the following examples can only demonstrate a part of the possible uses.

EXAMPLE 1

100 Parts by weight of a polyvinyl alcohol having a viscosity of the 4 % aqueous solution at 20° C of 4 mPa · s and an ester number of 20 mg of KOH/g are dissolved while stirring in a vapor bath together with 2 parts by weight of calcium hydroxide suspended in 900 parts by weight of water. A milky solution is obtained having a pH of 11. About 2 % by weight of residual acetyl groups still present in the polyvinyl alcohol can be easily saponified in this highly alkaline medium at the dissolution temperature of 90° C. It can be seen from infrared spectra that the polyvinyl alcohol used is completely saponified.

The pH of the solution of the polyvinyl alcohol thus treated is brought to a value of about 7 by adding 85 % phosphoric acid at a temperature of about 70° C. Thus excess calcium hydroxide is neutralized and all of the calcium ions are precipitated in the form of difficulty soluble calcium phosphate or calcium hydrogenophosphate, which in a finely divided form acts as a neutral practically water-insoluble inert filler, which is desired for further applications of the solutions.

Films of a thickness of 250 μm are cast to demonstrate the reduced solubility of the thus past-saponified polyvinyl alcohol, from both a solution of the untreated polyvinyl alcohol and from a solution of the polyvinyl alcohol treated according to the above process. These films are dried in all of the examples first for 24 hours at room temperature and then for 3 hours at a temperature of 70° C under a reduced pressure of 20 torrs. The weight remains constant under these conditions.

The films thus obtained, which have the same surface area, are sewed in wide-meshed gauge bags of synthetic fibers and extracted to exhaustion in an excess of about 2 liters of water at a temperature of 40°, 60° and 75° C.

The film residue in the gauge bags is dried again at room temperature and then under 20 torrs at 70° C. Thus the water soluble part of polyvinyl alcohol in all of the examples at the different temperature is determined gravimetrically:

| poly vinyl alcohol | portion dissolved out by extraction at | | |
|---|---|---|---|
| | 40° C | 60° C | 75° C |
| untreated | 65 % | 90 % | 100 % |
| treated according to the invention | 15 % | 49 % | 87 % |

EXAMPLE 2

A polyvinyl alcohol of an ester number of 20 mg of KOH/g and a viscosity of the 4 % aqueous solution of 10 mPa.s is treated as in Example 1. Three films of the same thickness and area are cast both from the starting polyvinyl alcohol and from the polyvinyl alcohol treated according to the invention. Their solubility in water at a temperature of 40°, 60° and 75° C is determined:

| poly vinyl alcohol | portion dissolved out by extraction at | | |
|---|---|---|---|
| | 40° C | 60° C | 75° C |
| untreated | 48 % | 94 % | 97 % |
| treated according to the invention | 5 % | 49 % | 85 % |

EXAMPLE 3

A polyvinyl alcohol having an ester number of 10 mg of KOH/g and a viscosity of the 4 % aqueous solution of 28 mPa·s at 20° C is treated in analogous manner to Examples 1 and 2. The films obtained from the untreated polyvinyl alcohol and the polyvinyl alcohol treated according to the invention are examined as in Example 1.

It can be seen from the result that a residual acetyl content in the polyvinyl alcohol of only 1 mol % has a considerable influence on the solubility of the corresponding polyvinyl alcohol film:

| poly vinyl alcohol | portion dissolved out by extraction at | | |
|---|---|---|---|
| | 40° C | 60° C | 75° C |
| untreated | 20 % | 80 % | 96 % |
| treated according to the invention | 3 % | 12 % | 40 % |

EXAMPLE 4

100 Parts by weight of a polyvinyl alcohol having an ester number of 140 mg of KOH/g and a viscosity of the 4 % aqueous solution of 18 mPa·s are dissolved in 900 parts by weight of cold water by stirring and heating the mixture in a water bath to about 90° C, until the polyvinyl alcohol has completely dissolved after 15 minutes.

12 Parts by weight of calcium hydroxide are added by mixing

12 Parts by weight of calcium hydroxide are added by mixing to the polyvinyl alcohol solution still warm and then the solution is stirred for about 20 minutes until it has cooled.

The cooled solution of the polyvinyl alcohol still alkaline is rapidly neutralized with 85 % phosphoric acid. Thereby excess calcium is neutralized and precipitated in a finely divided form together with the calcium acetate formed during the saponification as difficulty soluble calcium phosphate. A possible excess of phosphoric acid may be removed by adding calcium acetate.

Comparable films are cast both from the untreated polyvinyl alcohol and the polyvinyl alcohol treated according to the invention in the manner described in the preceding examples. The soluble portions thereof are determined by exhaustive extraction.

| polyvinyl alcohol | solubility at | | |
|---|---|---|---|
| | 40° C | 60° C | 75° C |
| untreated | 47 % | 94 % | 100 % |
| treated according to the invention | 5 % | 17 % | 45 % |

EXAMPLE 5

A polyvinyl alcohol having an ester number of 20 mg of KOH/g and a viscosity of the 4 % aqueous solution of 20 mPa·s is treated in aqueous solution as in the Examples 1 to 3. The films cast of comparable thickness and area both from untreated polyvinyl alcohol and from polyvinyl alcohol treated according to the invention contain the following water-soluble portions after exhaustive extraction with water:

| polyvinyl alcohol | dissolved portion at | | |
|---|---|---|---|
| | 40° C | 60° C | 75° C |
| untreated | 29 % | 89 % | 95 % |
| treated according to the invention | 4 % | 14 % | 47 % |

EXAMPLE 6

This example demonstrates that the solubility of a polyvinyl alcohol of extremely low viscosity and a very high ester number can be modified by the treatment according to the invention.

100 Parts by weight of a polyvinyl alcohol having an ester number of 200 mg of KOH/g and a viscosity of the 4 % aqueous solution of 2.5 mPa·s at 20° C are dissolved as in Example 4, 13 parts by weight of calcium hydroxide are added and the mixture is stirred until the solution has cooled. The excess calcium hydroxide is determined by means of a drop of phenolphthaleine. Calcium phosphate is then precipitated with phosphoric acid as in Example 4.

The following table shows the solubility in water of the films both from untreated polyvinyl alcohol from and treated polyvinyl alcohol at 40°, 60° and 75° C.

| polyvinyl alcohol | dissolved portion at | | |
|---|---|---|---|
| | 40° C | 60° C | 75° C |
| untreated | 99 % | 99 % | 100 % |
| treated according to the invention | 51 % | 69 % | 100 % |

EXAMPLES 7 to 12

The result obtained is the same as above when starting from the same types of polyvinyl alcohol as in Example 1 to 6 and when precipitating the calcium ions as calcium carbonate by injecting carbon dioxide into the solution of polyvinyl alcohol or by adding and stirring in pieces of solid carbon dioxide.

Calcium carbonate formed thereby in a finely divided state is the filler used most frequently in a number of applications of polyvinyl alcohol, for example in the painting and adhesive field, as well as in the paper industry.

EXAMPLES 13 to 18

The polyvinyl alcohol types used are the same as in Examples 1 to 6, but instead of calcium hydroxide there is used the corresponding quantity of barium hydroxide and the barium ions are precipitated quantitatively in the solution of polyvinyl alcohol, to yield barium sulfate, by means of 2N sulfuric acid. Films of the after-treated polyvinyl alcohol containing barium sulfate are cast and the solubility of the films is compared with that of the starting polyvinyl alcohol. The water-resistance determined corresponds to that of the Examples 1 to 6 and 7 to 12.

EXAMPLE 19

A polyvinyl alcohol film or a polyvinyl alcohol coating is prepared by means of a coarse precipitation product conferring an the alcohol a rough surface, in the following manner: A polyvinyl alcohol having an ester number of 10 mg of KOH/g and a viscosity of the 4 % aqueous solution of 28 mPa·s is dissolved while stirring in a vapor bath for 45 minutes with 2 parts by weight of calcium hydroxide in 900 parts by weight of water.

The resultant milky solution having a pH of 11 is slowly neutralized at about 70° C while stirring with 30 % phosphoric acid.

The crystals formed thereby are; larger than those in the preceding examples. By applying the solution thus treated for example to a cardboard for packaging purposes, there is obtained a rough slip-resistant surface, which is desirable for stapling.

What is claimed is:

1. A process for the manufacture of films and coatings containing polyvinyl alcohol and having a reduced solubility in water, which comprises submitting polyvinyl alcohol having an ester number of at most 200 mg of KOH/g in aqueous phase to an after-saponification with alkali metal or alkaline earth metal hydroxide at elevated temperature, precipitating the alkali metal or alkaline earth metal ions of said hydroxide by addition of a substance containing anions that form therewith a compound that is difficulty soluble in water, said compound constituting an inert filler that remains in the polyvinyl alcohol, applying the suspension of polyvinyl alcohol thus prepared to a substrate in the form of a film or coating and drying it.

2. The process as claimed in claim 1, which comprises after-saponifying the polyvinyl alcohol in aqueous phase with a stoichiometric excess of alkaline earth metal hydroxide and precipitating the alkaline earth metal ions with said anions.

3. The process as claimed in claim 2, which comprises after-saponifying the polyvinyl alcohol in aqueous phase with an excess of calcium hydroxide and precipitating the calcium ions with said anions, the precipitation product difficulty soluble in water acting as an inert filler in the polyvinyl alcohol film or in the coating.

4. The process as claimed in claim 3, which comprises after-saponifying the polyvinyl alcohol in aqueous phase with an excess of calcium hydroxide and precipitating the calcium ions with phosphoric acid in the form of calcium phosphate.

5. The process as claimed in claim 3, which comprises after-saponifying the polyvinyl alcohol in aqueous phase with an excess of calcium hydroxide and precipitating the calcium ions as calcium carbonate, with carbonate ions, which are produced optionally by addition of carbon dioxide, the precipitate acting as an inert filler in the polyvinyl alcohol film or coating.

6. The process as claimed in claim 3, which comprises after-saponifying the polyvinyl alcohol in aqueous phase with an excess of calcium hydroxide and precipitating the calcium ions with oxalate ions.

7. The process as claimed in claim 2, which comprises after-saponifying the polyvinyl alcohol in aqueous phase with an excess of barium hydroxide and precipitating the barium ions with sulfuric acid, the precipitate acting as an inert filler in the polyvinyl alcohol film or coating.

8. A process according to claim 1 wherein the film or coating is dried by heating it to an elevated temperature at a reduced pressure.

* * * * *